Figure 1:
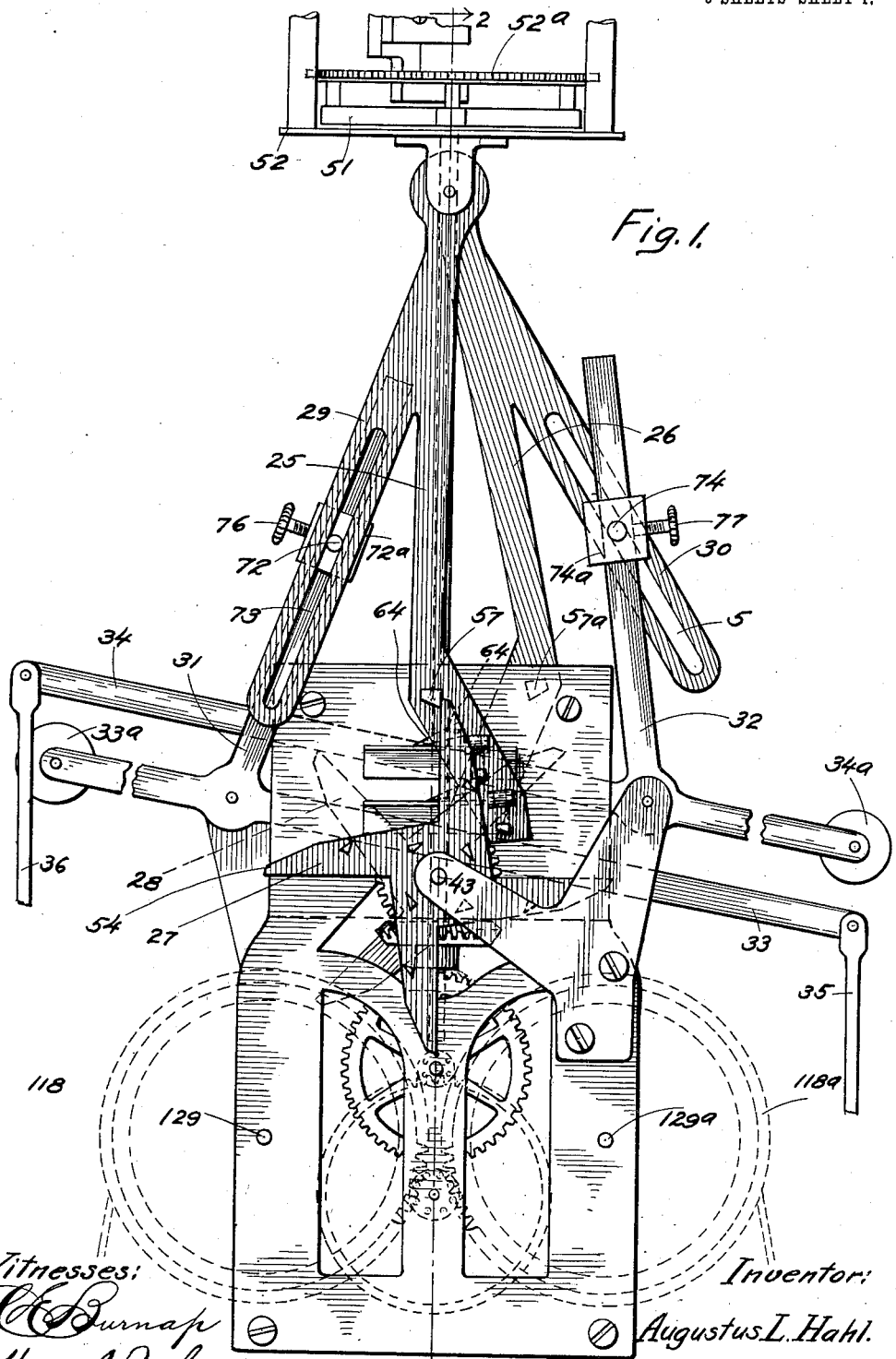

A. L. HAHL.
PNEUMATIC CLOCK MECHANISM.
APPLICATION FILED DEC. 9, 1911.

1,098,494.

Patented June 2, 1914.
6 SHEETS—SHEET 3.

Fig. 3ª

Witnesses
C. E. Burnap
Henry A. Parks

Inventor:
Augustus L. Hahl
By
Sheridan, Wilkinson, Scott and Richmond
Att'ys

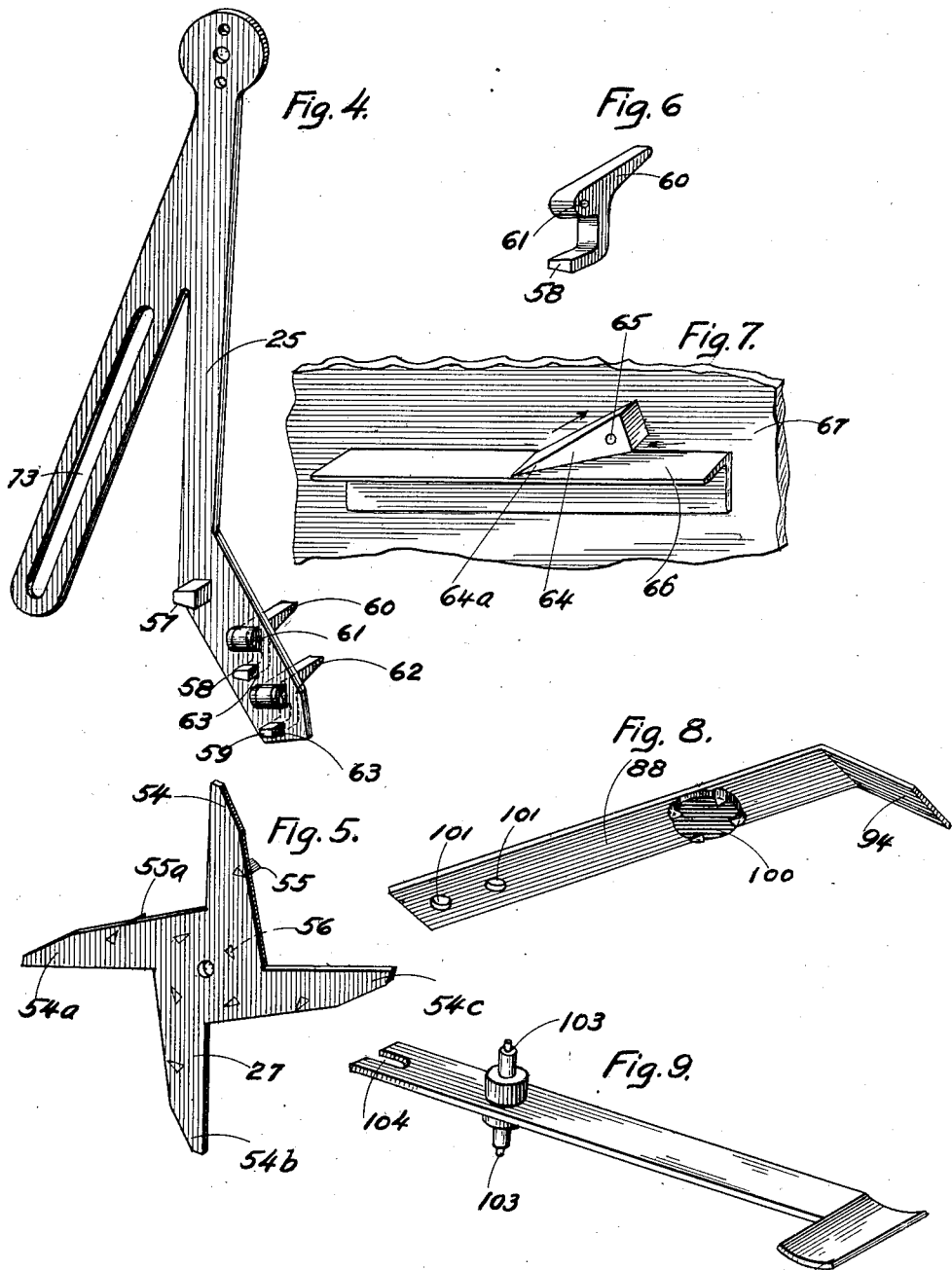

A. L. HAHL.
PNEUMATIC CLOCK MECHANISM.
APPLICATION FILED DEC. 9, 1911.
1,098,494.
Patented June 2, 1914.
6 SHEETS—SHEET 5.
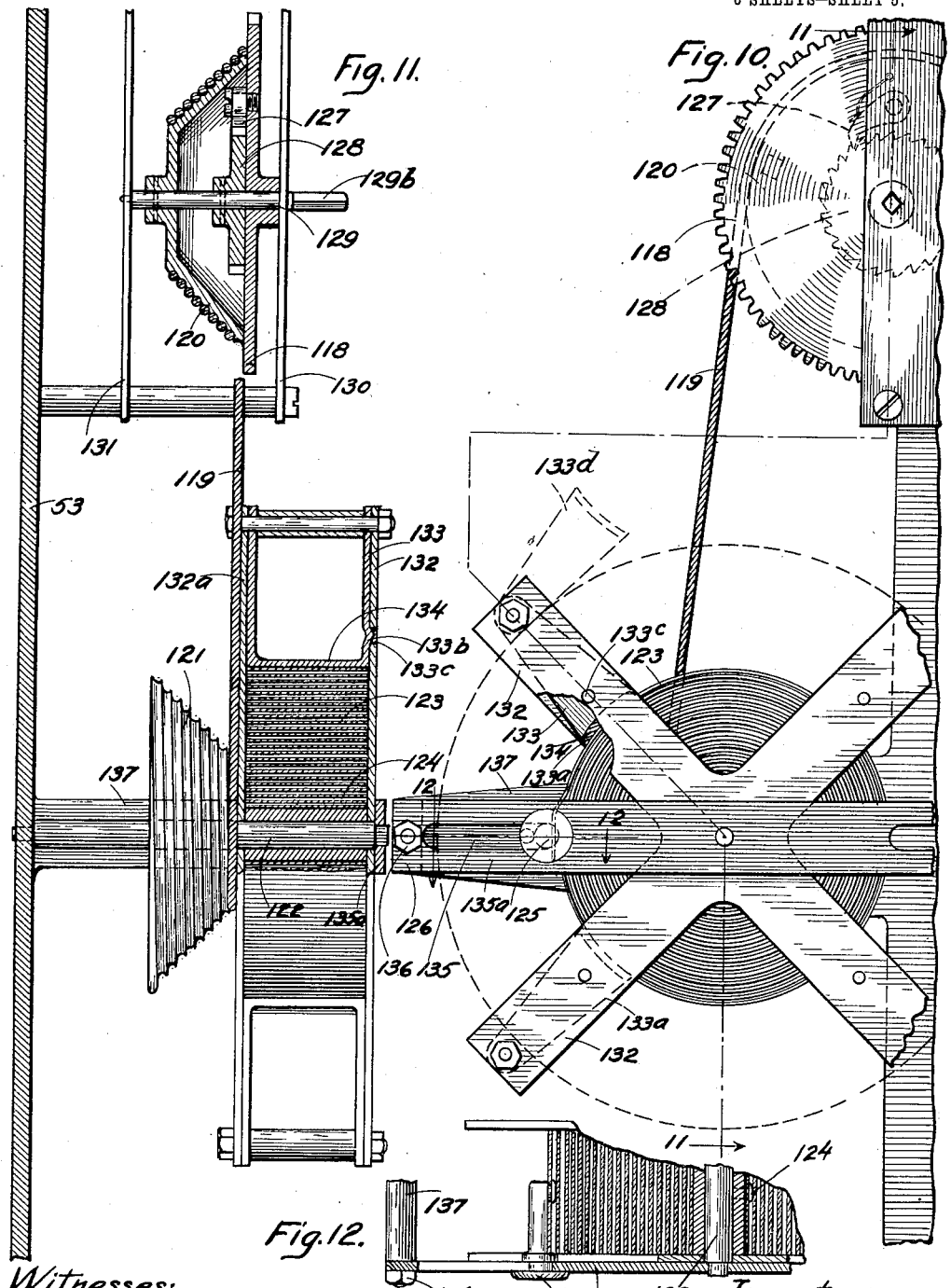
Witnesses:
C. C. Burnap
Henry A. Parks
Inventor:
Augustus L. Hahl
By Sheridan, Wilkinson, Scott & Richmond Att'ys

A. L. HAHL.
PNEUMATIC CLOCK MECHANISM.
APPLICATION FILED DEC. 9, 1911.

1,098,494. Patented June 2, 1914.
6 SHEETS—SHEET 6.

Witnesses:
Inventor
Augustus L. Hahl
By Sheridan Wilkinson Scott & Richmond Attys.

UNITED STATES PATENT OFFICE.

AUGUSTUS L. HAHL, OF CHICAGO, ILLINOIS.

PNEUMATIC CLOCK MECHANISM.

1,098,494.   Specification of Letters Patent.   Patented June 2, 1914.

Application filed December 9, 1911. Serial No. 664,807.

*To all whom it may concern:*

Be it known that I, AUGUSTUS L. HAHL, a citizen of the United States, residing at Chicago, in the county of Cook and State of Illinois, have invented certain new and useful Improvements in Pneumatic Clock Mechanism, of which the following is a specification.

My invention relates to clocks, and more particularly to master clocks of pneumatic time systems.

In the master clocks originally known, the air-displacing mechanism was subjected to an increasing resistance, due to the compression of the air, and this resistance reached a maximum at the end of each operation. The driving power being uniform, a sluggish and uncertain action resulted near the end of the operation, with frequent failure to reach the end. The momentum frequently assisted the train in completing the operation, but at the time the next operation should have begun the inertia and friction of the parts prevented starting, and complete stoppage thereby resulted. On winter nights the thickened oil acted as a further resistance. A leakage of air in the system occasionally caused a partial vacuum, which still further increased the resistance and made a stoppage almost certain.

Previously to the year 1897 I conceived the idea of making the time movement control the opening of valves at the end of the sixtieth second of each operation, these valves opening to the outer air and preventing the vacuum. The obstruction was thereby removed and the train was free to run. This idea formed the subject matter of U. S. Patent No. 598,066 granted to me January 25, 1898, on an application filed June 1, 1897. It served as a remedy, but did not remove the inherent conditions of the system.

In my present invention I have conceived means for the prevention and elimination of the conditions referred to, in which the air does not have to be released to enable the train to start up positively. I substantially reverse the operative conditions of the previous free air time system, and bring about the possibility of higher efficiency as well as a simplification of the entire mechanism. In the present invention I make use of mechanism in which the driving power, be it derived from a spring, weight, or other driving element, is enabled to actuate the mechanism with an increasing mechanical advantage or leverage which is substantially proportionate to the increasing resistance.

A further feature of my present invention is the removal of the necessity of making the time movement control the valves. I construct the mechanism referred to in such a manner as will enable the driving power to start the mechanism positively without the necessity of first releasing the air. The mechanism referred to comprises levers which are actuated by toothed or studded arms or cams, in which the leverage is made to vary progressively in a manner substantially proportionate to the increasing resistance. A uniform driving power is thereby enabled to overcome the higher resistance of the compressed air with the same facility that it overcomes the resistance at the beginning of the operation. This will result in the requirement of less driving power, as well as in a greater certainty of operation.

My present invention also includes devices which engage the air-displacing and compressing mechanism at the end of its operation in such a manner as to remove the resistance from said mechanism preparatory to the next succeeding operation. The next operation is then able to begin without meeting with the same resistance. Immediately upon starting, however, the said devices are tripped to permit the operation to continue. The devices just mentioned, however, may be eliminated by increasing the leverage above described to such an extent that the driving power will be fully able to start the mechanism with certainty. The locking devices mentioned will then be superfluous. It is consequently no longer necessary to put the control of the valves upon the time movement to release the air ahead of starting. In place of this, in my present invention I provide very simple valves which are positively opened by the driving power at the end of each deflating operation. By this means the entire volume of the air is retained in the system and assists in expanding the bellows in the return stroke, thereby assisting the motor. The air being thus exhausted back into the bellows, quicker action results, making it possible to operate clocks every half minute should it be desired. Practically the same air being used continually, only such quantity flowing through the valves as is necessary to compensate for leakage and change of temperature, condensation and accumulation of moisture in the system are prevented with greater certainty. The sensitive inverted piston valve, in which the back pressure is depended on to assist in perfect air tight seating, referred to in my patent granted Jan. 25, 1898, No. 598,066, is replaced by an elastic member, covering a small orifice, which cannot be unseated by back pressure.

A further feature of my present invention is a single fold bellows, the air space of which can be reduced almost to nothing at the end of its stroke. It will displace more air and consequently will require a shorter stroke and less power.

A further feature of my invention is improved mechanism for connecting the driving spring to the working parts of the system. The various means for saving power previously mentioned make it possible for me to use spring power for small master clocks. By my improved method of driving by spring power, I remove the difficulties due to the variation of power as the spring unwinds, and also the difficulty of access to said springs in keeping them cleaned and oiled.

A further feature of my invention is mechanism for preventing stoppage of the apparatus due to partial vacuums caused by leaks. This is particularly advantageous in large installations. In this feature provision is made that will automatically cause a valve to open at the beginning instead of at the end of the return stroke of the bellows and prevent the partial vacuum that would exist. These features will be inoperative when the system is running under normal conditions, but should a leakage occur, they will be automatically brought into action. I also provide a pressure indicating mechanism which will give notice of such leakage.

Other objects and important features of my present invention will become apparent in the following specification, when taken in connection with the drawings, and the novel features and combinations thereof will be more particularly set forth in the claims.

Figure 2:
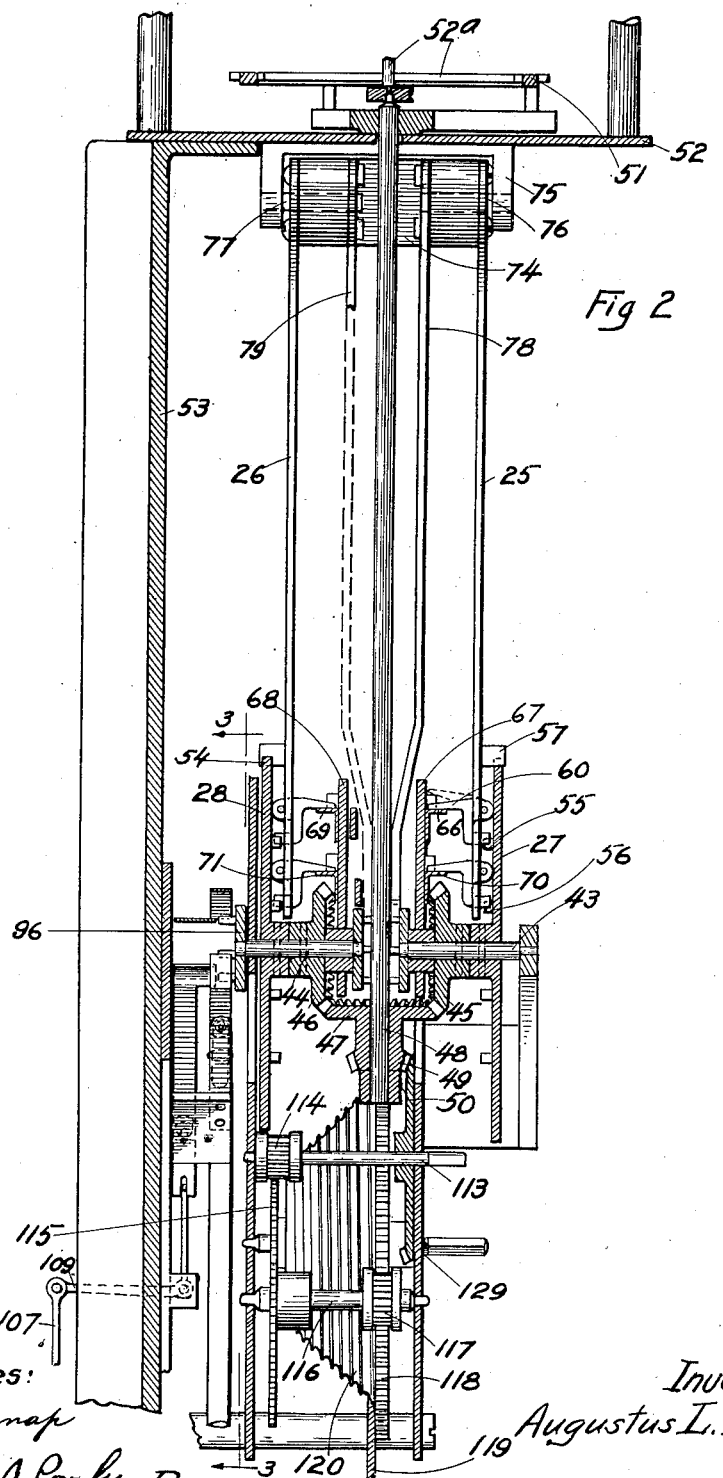
Figure 3:
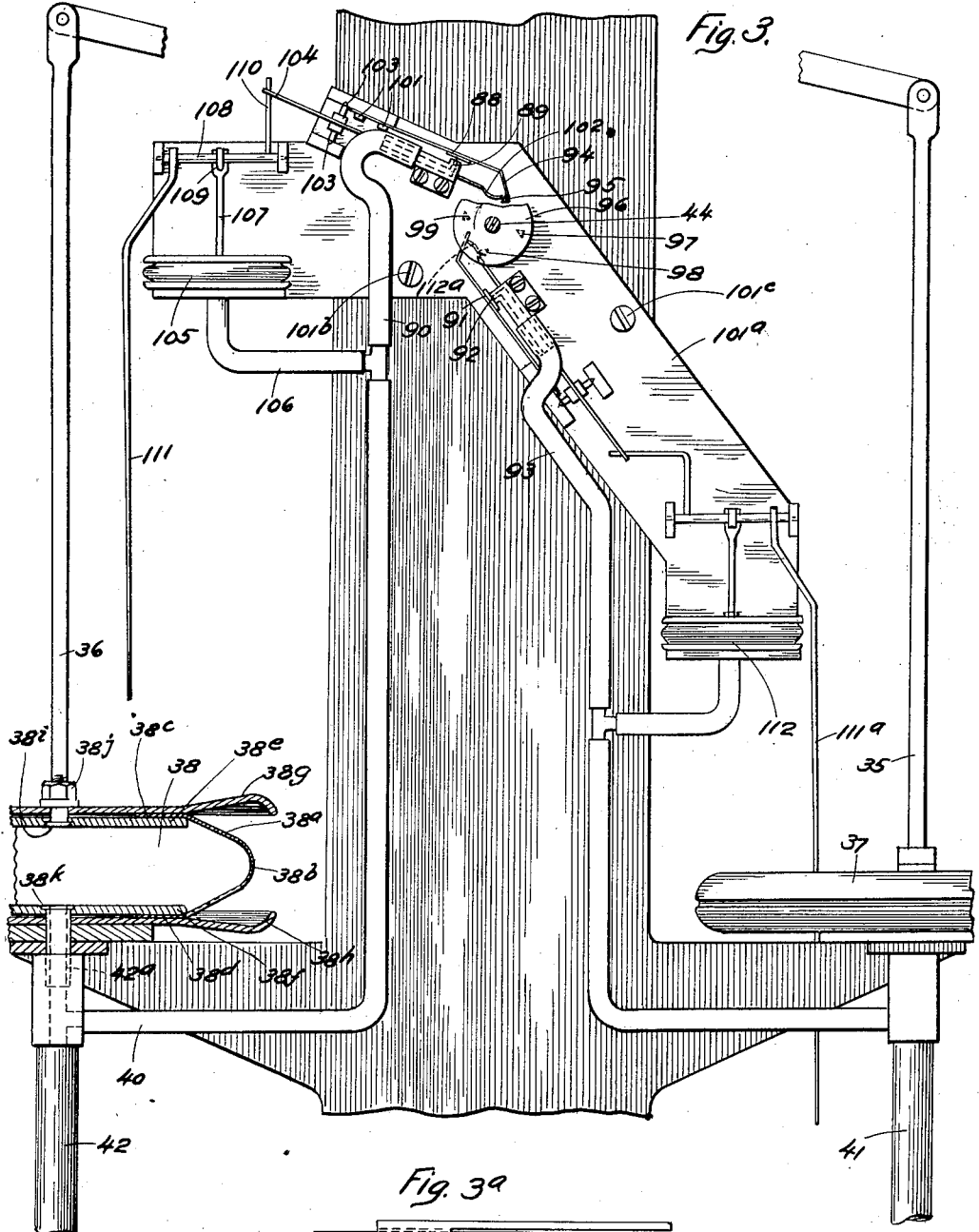
Figure 13:
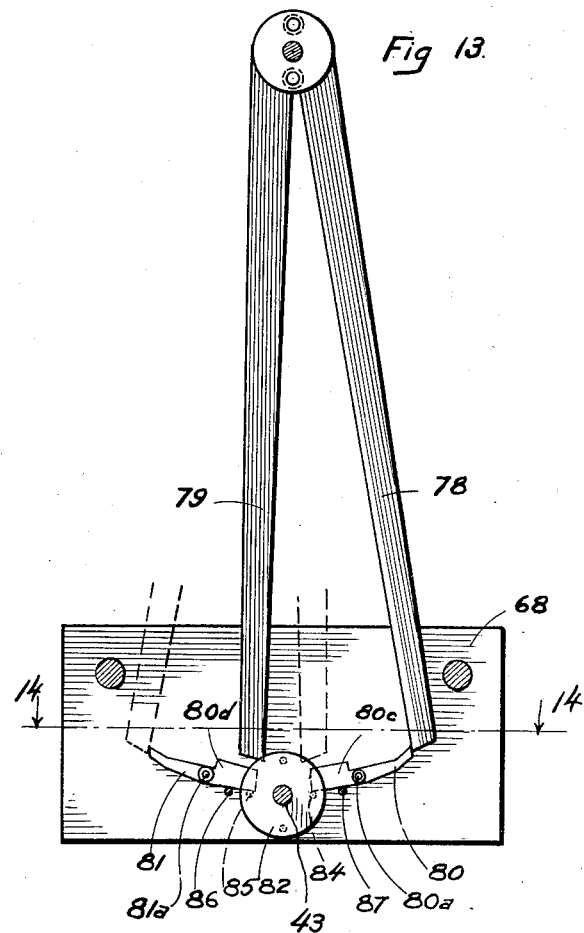
Figure 14:
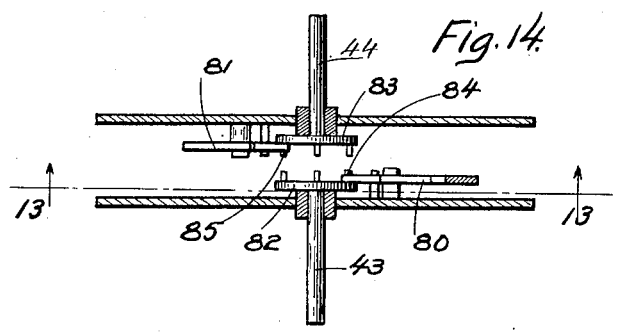

In the drawings Figure 1 is a front elevation of the central portion of the mechanism, showing more particularly the mechanism by which the mechanical advantage or leverage of the driving power is progressively increased. Fig. 2 is a vertical section of the same viewed at right angles thereto, taken along the line 2 2 of Fig. 1. Fig. 3 is a vertical section viewed from the front, taken substantially along the line 3—3 of Fig. 2, and showing principally the valve mechanism and bellows construction. Fig. 3ª is a plan view of the valve mechanism. Fig. 4 is a perspective view of one of the levers of the driving mechanism. Fig. 5 is a perspective view of one of the star wheels which actuates said levers. Fig. 6 is a perspective view of a detail of one of said levers. Fig. 7 is a perspective view of a detail associated with said levers. Fig. 8 is a perspective view of one of the spring valves. Fig. 9 is a perspective view of one of the leakage actuated valve lifters. Fig. 10 is a front elevation of one of the driving spring connecting mechanisms. Fig. 11 is a vertical section thereof, taken substantially along the line 11 11. Fig. 12 is a horizontal fragmentary sectional view of the spring connections, taken substantially along the line 12 12 of Fig. 10. Fig. 13 is a detail of the temporary locking or retaining mechanism for the bellows actuating levers, in section taken along line 13—13 of Fig. 14. Fig. 14 is a horizontal section of the same, taken substantially along the line 14 14 of Fig. 13.

I accomplish one of the principal objects of my invention by means of the levers 25 and 26 which are rigidly attached one to the other and suspended from a pivot above, and are actuated by star wheels 27 and 28, respectively, which are driven in opposite directions by connections with the driving spring or other source of power. The said star wheels are provided with means, which will be described later, for actuating said levers with an increasing mechanical advantage or leverage. These levers 25 and 26 are provided with arms 29 and 30, respectively, which are pivotally and adjustably attached to arms 31 and 32 of the bellows actuating levers 33 and 34. The last named levers are operatively connected with the two bellows 37 and 38 by which air impulses are sent through the service pipes 41 and 42 of the pneumatic system.

The star wheels 27 and 28 are fixed to the shafts 43 and 44, respectively, these shafts being mounted in axial alinement. Fixed to these shafts are two bevel gears 45 and 46, respectively, which mesh with and are driven by a common bevel gear 47. The latter bevel gear is fixed to an upright shaft 48 carrying another bevel gear or pinion 49 which receives power from the gear 50 of the driving spring connections or power train.

The upright shaft 48 is provided at its upper end with an internal gear 51 which actuates a time train and also a controlling or releasing mechanism for said power train. This controlling and releasing mechanism is associated with the time train and is not shown or described in the present application, for the reason that it forms the subject matter of a copending application. Small portions of this controlling mechanism are indicated at 52ᵃ and the lower portion of the framework thereof is indicated at 52. This framework is mounted at the top of a vertical frame member 53 which serves as the main frame of the entire apparatus.

The star wheels 27 and 28 are adapted to engage projecting parts upon the levers 25 and 26 successively, and to impart driving force thereto with increasing mechanical advantage or leverage at each step. Each star wheel is adapted to first engage its respective lever at the extreme end 54 of its arms, a lug 57 on the lever being provided to receive the pressure of said arms. Each arm of the star wheel is also provided with lugs 55 and 56 which are adapted to engage other lugs 58 and 59, respectively, on its respective lever 25 or 26. The end 54 of one of the arms of a star wheel is adapted to first engage the lug 57 and impart a short oscillatory motion to said lever. At the end of this motion the lug 55 comes into engagement with the lug 58 and imparts a further motion to the lever. The lug 56 then comes into engagement with the lug 59 and imparts a still further movement to said lever.

The above described three steps in the movement complete the oscillation of the lever 25 in one direction, and since the lever 26 is rigidly attached thereto, the latter lever moves in the same direction. This latter lever 26 is then in position to receive the pressure of the other star wheel 28 which moves in the opposite direction to the star wheel 27, and an oscillation in the opposite direction takes place. While I have described three steps in the movement any other desired number can be used.

In order to permit the two lugs 55 and 56 to pass the lugs 58 and 59 in the return stroke without interference therewith, I provide a pivotal mounting for said lugs 58 and 59. These lugs, one of which is shown complete in Fig. 6, are provided with rearwardly projecting arms 60 which engage a lifting device 64 when moving in the return direction. The pivotal connection 61 with the body of the lever 25 permits an oscillation of the said lug and allows it to be drawn back through the aperture 63 of said lever.

The lifting device 64, preferably has the general shape of a wedge and is pivoted at its large end upon a pin 65 in the frame 67. The small end 64ᵃ of the wedge normally rests upon a supporting device or shelf 66 which is fixed to the frame. The wedge is so located that when the arm 60 travels in one direction it passes beneath the wedge and lifts it. When the arm 60 is traveling in the other direction it slides along the upper inclined surface of the wedge, as shown by the arrow, and finally drops over the end. Another portion 68 of the framework supports similar lifting devices for the rear star wheel 28. The supporting members or shelves 70 and 71 are in all respects similar to the shelves 66 and 69. The levers 25 and 26 are provided with pivotal connections 72 and 74 with the arms 31 and 32, these pivotal connections being slidable along the arm in order to permit adjustment for variable strokes of the bellows. It is necessary to give the bellows of one line a different stroke from that of the other line, according to the number of secondary clocks. This adjustment consists of the pins 72 and 74 which are carried by blocks 72ᵃ and 74ᵃ which may be moved along the arms 31 and 32 and fixed in any position thereon by means of the locking screws 76 and 77, or their equivalents, or suitable fastening devices.

In order that the pressure of the bellows may not be imposed upon the train when started I provide means for catching or retaining the levers 25 and 26 at the end of every stroke. These retaining devices comprise arms 78 and 79 which are fixed to said levers and the detents 80 and 81 therefor which are pivoted at 80ᵃ and 81ᵃ, respectively, to the frame. These detents are provided with weighted portions 80ᶜ and 80ᵈ which cause them to maintain their engagements with said arms 78 and 79 until disengaged therefrom by the pins 84 and 85. These pins 84 and 85 are attached to the two shafts 43 and 44, respectively, being carried by the crank disks 82 and 83. Small pins 86 and 87 fixed in the frame hold the said detents in their proper normal positions.

I provide means for equalizing the pressure of air in the system with the outside air by means of valves 88 and 91 which are positively actuated by the driving train and which are entirely independent of the time train. These valves are preferably made of flat springs which close upon valve seats 89 and 92 in which are apertures opening into the tubes 90 and 93, respectively, leading to the service pipes 41 and 42 of the pneumatic system. The flat springs 88 and 91 are provided at their ends with angularly disposed portions 94 which are engaged by pins 95, 97, 98 and 99, which are carried by a disk 96 fixed to the shaft 44. These valve springs may be provided with small disks or washers of resilient material 100 for making close contact with the valve seats. These valve springs are so mounted and disposed with relation to the shaft 44 that the valve 88 will be opened by the pin 95 at the end of the actuating movement of the star wheel 28, and at the end of the return movement of the bellows produced thereby. It will be seen that the valve 88 will remain closed until the end of said movement. The end of the valve spring will rest upon the outer surface of the pin 95 during the entire period of rest which occupies the predetermined space of time following said movement. The other valve spring 91 is so mounted that its end will have a position midway between two of the pins 98 and 99 during the above described interval. There being four of the pins, it will be seen that an angular movement thereof of 45 degrees, or one-eighth of a revolution, will take place between the opening times of the two valves. The two valves therefore are open alternately in alternate periods of one minute each. Each of the valves is so disposed with relation to the pins that it will open at the termination of the return or inflating stroke of the particular bellows with which it is associated. Each of said valves therefore remains closed during the time that the bellows is being returned and the air in the service pipe is retained therein and assists in said return. The valve is so placed that it is open during the period of rest of one minute at the end of said return stroke, and equalization of the pressure in the service pipe and bellows with the outside air pressure may take place constantly. The quantity of air that may flow through the valve will be very small, being that only which is due to variation in density caused by meteorological changes, and for that reason the valves may be very small in dimensions. The quantity of air flowing through the valve will be so small that practically the same volume of air will remain in the system for an indefinite period, if there is no leak.

The star wheels and levers are so proportioned that each star wheel gives to its particular lever the desired movement in one-eighth of a revolution of said star wheel. The alternate eighth revolutions are effective in giving motion to the particular lever with which each star wheel is associated. The return movement of said lever brings it into operative relation with its particular star wheel.

The valve springs are mounted upon the framework by means of screws which may be inserted in holes 101. That portion of the framework which is directly associated with the valves may be constructed of a separate piece 101$^a$ and removably attached to the main frame by screws 101$^b$ and 101$^c$.

I also provide means whereby the interior of the system may be open to the outside air at the beginning of the return or inflating stroke of the bellows to permit equalization during said stroke in case of leakage. It may sometimes occur that a leak may exist which permits the air to escape during the time that it is under pressure after an impulse stroke has taken place. In the subsequent return or inflating stroke a partial vacuum would then be produced in the system which would resist said return or inflation stroke. I provide for equalization during this stroke by an auxiliary valve opening device 102 for the valve 88. A similar auxiliary lifting device 112$^a$ is provided for the other valve 91. This auxiliary lifting device is actuated by the air pressure in the system.

For the above purpose, I provide a small lever which terminates in a curved and angularly projecting portion 102 which has a position immediately beneath the angular end 94 of said valve spring. This lever is pivotally mounted at 103 in the framework and is provided with a notched end 104 to receive an arm 110 actuated by a diaphragm 105. This diaphragm 105 is actuated by air pressure through the branch pipe 106 leading to the main service pipe 42. The intermediate connections between the arm 110 and the diaphragm 105 comprise a small shaft 108 carrying said arm and also carrying another arm 109 which is pivotally attached to the stem 107 attached to the upper plate of said diaphragm.

It will be seen that a reduction of pressure beneath the diaphragm 105 will cause the same to descend and through the mechanism above described to cause the end of the lever 102 to move into position beneath the end 94 of the valve spring. The downwardly curved portion of said lever causes it to lie in the path of the pin 99, and when said pin reaches it, it is adapted to lift it and cause it to lift the spring 94 of valve 88. The end of the lever 102 normally lies outside of the path of the pin 99 and therefore when no leakage has occurred this auxiliary lifting action will not occur. In order to indicate to an observer that a leak has occurred, I provide an indicating arm 111 attached to the shaft 108. The diaphragm 112 is in every way a duplicate of the diaphragm 105 and is connected with the auxiliary lifting lever 112$^a$ by mechanism which is substantially similar to that described above.

Returning to the driving spring connections, the bevel gear 50 is fixed to a shaft 113 mounted in the main frame. This shaft carries a pinion 114 which meshes with and is driven by the spur gear 115 fixed to a shaft 116. This shaft carries a pinion 117 which meshes with and is driven by a spur gear 118 which is loosely mounted upon a shaft 129. The pinion 117 is also driven by a second spur gear 118$^a$ which is loosely mounted upon a shaft 129$^a$, these two parts being exact duplicates of the gear 118 and shaft 129. There are two of the gears 118 and 118$^a$ which are connected to two driving springs through mechanism which will be described. The two shafts 129 and 129$^a$ are mounted in the frame which comprises plates 130 and 131 suitably attached to the main frame 53. These shafts have conical winding drums, one of which only is shown at 120. A cable 119 is wound in the groove of said drum and also upon another drum 121 fixed to a shaft 122. These drums taper in opposite directions, in order that the cable may wind on to the large end of one drum while it is winding off the small end of the other drum. The purpose of this arrangement is to counteract the reduction in the driving force of the spring as it becomes unwound. A driving spring 123 has its inner end fixed at 124 to the shaft 122 and its outer end attached to a pin 125 carried by the frame 126. The pin 125 is slidably mounted in the framework for reasons which will be described later. The gear 118 carries a pawl 127 which is engaged by a ratchet wheel 128 fixed upon the shaft 129. The shaft 129 is provided with a square end to receive a winding key, as shown at 129$^b$. As previously stated, these parts are duplicated in order to make connections from two driving springs 123 to two gears 118 and 118$^a$.

In order to permit easy access to the driving springs 123 for the purpose of cleaning and oiling I provide an expanding casing for said springs. For this purpose I provide cross shaped inclosing members 132, 132$^a$ which are placed adjacent the lateral edges of the spring and the swinging members or clamps 133 which are pivoted to said inclosing members. The swinging members may bear upon the outer turn of the spring when in their normal positions, as shown at 133$^a$. When swung outwardly to allow expansion beyond ordinary working limits they will have a position represented by the dotted line 133$^d$. The spring may then be easily cleaned without removal. These clamps 133 are adapted to bear upon the periphery of the spring when in their normal conditions, as shown in Fig. 10, at 133$^a$. They are provided with an inner cross bar or connecting member 134 which is preferably curved upon its inner face to bear uniformly upon the surface of the spring. In order to hold them securely in their normal positions, I provide a small projection upon them as shown at 133$^b$, which is adapted to enter apertures 133$^c$ in the cross arms. There will be sufficient elasticity in the cross arms to permit them to slide into and out of their places when it is desired to hold the spring within its normal limits.

The outer end of the spring is fixed to the pin 125 which is slidable in a radial direction in the cross bar 135$^a$ of the framework. This cross bar is fixed at its two ends to the frame 137 by means of suitable screws 136. This cross bar has a slot 135 in which the said pin may slide. The outer end of the shaft 122 is supported by this cross bar. The cross shaped members 132 and 132$^a$ are loosely mounted upon said shaft.

In Fig. 10, one of the clamping members 133 is shown swung outwardly in dotted lines. This is the position occupied by the clamps when the spring is free to expand.

The operation of my improved mechanism has been largely referred to in the preceding description, but the following outline of the principal movements and functions of the parts is added. The user of the mechanism will wind up the clock by applying a winding key to the ends of the shafts 129 and 129$^a$. In rotating the said shafts, the ratchet wheels 128 will slip by the pawls 127 and the winding drums 120 will wind up the cables 119. These cables will unwind from the drums 121 and in so doing will cause a rotation of the shafts 122. This will cause the inner end of the springs 133 to rotate and as their outer ends are anchored to the pins 125 they will become wound. The driving springs will then be in condition to drive the mechanism, the ratchet wheels 128 imparting the driving force to the pawls 127. The gears 118 and 118$^a$ will rotate, and through the parts 117, 116, 115, 114, 113 and 50 will drive the bevel gear 49. This bevel gear will rotate constantly in one direction and by means of the gear 47 will drive the two bevel gears 45 and 46 in opposite directions. The shafts 43 and 44, therefore, rotate in opposite directions, and the star wheels carried thereby will rotate in opposite directions. The star wheel 27 will first engage the lug 57 on the lever 25 and the lugs 55 and 56 will engage in turn the lugs 58 and 59 on said lever 25. The lugs 55 and 56 will actuate the lever 25 with an increased driving power for the reason that they have a position on the star wheel closer to its axis, and also for the reason that the said lugs are farther from the pivotal point 76 of the lever 25. The star wheel, therefore, acts upon the lever 25 with a greatly increasing mechanical advantage or leverage, although the driving force of the spring is uniform. This increased leverage renders the mechanism capable of compressing the air in the bellows in the system with an increasing force which is substantially proportionate to the increasing resisting pressure of said air. The star wheel 28 acts in a similar manner upon the lever 26, but in the opposite direction. It will be understood that all of the above described driving mechanism operates periodically at intervals of one minute or other desired period of time. This operation is controlled by a detenting mechanism or releasing mechanism located in the upper portion of the framework, parts of which only are indicated at 51, 52$^a$, etc. The levers 25 and 26 actuate the pump arms 33 and 34 for the bellows through means of the stems 35 and 36. The weights 34ª and 33ª counter-balance the weights of said stems and arms, and relieve to some extent the work of the levers 25 and 26. In the actuating stroke of the levers 25 and 26 the small arms 60 and 62 of the lugs 58 and 59 pass below the lifting devices 64 and are not affected thereby. In the return strokes of said levers, the arms 60 and 62 pass above said lifting devices 64, and the lugs 58 and 59 are drawn inwardly and out of the path of the lugs on the star wheel.

It will be seen that the pump arms 33 and 34 have oscillating movements and that they move in one direction at the end of one minute and in the opposite direction at the end of the next minute. One of the bellows 38, therefore, remains deflated during one minute and the other bellows 37 remains deflated during the succeeding minute. Starting with the bellows 37, for example, it will be seen that the back pressure in the service pipe 41, and that part of the system connected with said service pipe, will assist the motive power in inflating said bellows during the return stroke. This back pressure was caused by the compression of the air in the system by the previous air displacing stroke and was retained in the system by the valve 91 which was closed at the beginning of said displacing stroke and remained closed throughout said displacing stroke. This valve will also remain closed throughout the inflating stroke or return stroke. At the end of the inflating or return stroke the valve will be opened. This will be effected by the pin 98 which will engage the end of the valve 91. The pin 98 will remain in contact with the end of said valve during the succeeding minute and, therefore, hold it open. During this period of one minute equalization between the pressure in the service pipe and the outside air can take place. Such equalization will require an extremely slight movement of air and moisture cannot accumulate. Practically the same volume of air will remain in the system indefinitely. Speaking now of the next downward stroke or deflating stroke of the bellows 37, the valve at once closes, due to the pin 98 leaving the end thereof. The resistance to the movement of the bellows will be slight at first, but will increase in the later portion of the stroke, due to the compression of the air. This resistance will begin at perhaps about half the length of the stroke. This resistance will partly be due to the lifting of the plunger plates on the small diaphragm in the secondary clocks, or to other actuating devices in said secondary clocks.

During the last stage of the operation of the down or deflating stroke after the diaphragms have been lifted, a further compression of the air is effected. This further compression is desirable in order to provide a slight margin of power. This renders it certain that the diaphragm will be positively actuated to the fullest extent. Should a leak occur in the system at any point the air would tend to escape while under pressure during the minute succeeding the down or deflating stroke of the bellows. When the upward stroke following this begins, a partial vacuum will be formed and the diaphragms 105 and 112 will descend and cause the auxiliary valve lifting devices 102 and 112ª to be moved outward beneath said valves. The pins 95, 97, 98 and 99 will then lift the valves at the beginning of the return stroke instead of the end as previously described. The partial vacuum occurring during the return stroke will then be relieved by air rushing into the system from the outside. Equalization would then take place during the return or inflating stroke, and although a leak may occur, my improved mechanism will be operated. When leakage occurs the indicating arms 111 and 111ª will move out of their normal position, giving notice thereof.

The two bellows 37 and 38 are constructed with a view to fully displacing the air from their interiors during the displacing stroke. For this reason each is provided with a flexible membrane 38ª having a single fold as shown at 38ᵇ. The edges of said membrane are securely held at 38ᶜ and 38ᵈ between the heads 38ᵉ, 38ᶠ and the plates 38ᵍ and 38ʰ, respectively. The heads 38ᵉ and 38ᶠ are given sufficient thickness to serve as a rigid member and are made flat or smooth upon their interior faces in order that they may fully displace the air when they come together. The exterior plates 38ᵍ and 38ʰ are provided with dished hollow portions at their outer edges which are designed to receive and support the membrane 38ª while it is under pressure at and near the end of the displacing stroke. A bulging and straining effect upon the membrane is thereby prevented. A more complete displacing effect is also brought about by the said plates, for the reason that they bear upon the membrane and prevent its expansion. The head 38ᵉ and the plates 36ᵍ are held in close relation by the flanged end 38ⁱ on the rod 36 together with the nut 38ʲ, which is threaded on said rod. The flanged end 38ᵏ on the outlet pipe 42ª serves a similar purpose in the lower head.

It will be seen that the arms 31 and 32 are given a substantially vertical position and that for this reason they do not greatly affect the balance of the levers 33 and 34 in their oscillations. The adjustment of the stroke of the bellows does not affect the balance. Neither the weights 33ª and 34ª nor the points of attachment of the bellows to the arms 33 and 34 have to be changed when making this adjustment.

While I have described more or less precisely the details of construction, I do not wish to be understood as limiting myself thereto, as I contemplate changes in form and the proportion of parts and the substitution of equivalents as circumstances may suggest or render expedient without departing from the spirit of my invention.

I claim:

1. In a pneumatic clock system, air displacing mechanism, a motor for operating said air displacing mechanism, a time train for controlling said motor, and mechanism actuated by said motor for governing the flow of air to and from the system.

2. In a pneumatic clock system, air displacing mechanism, a motor for operating said air displacing mechanism, a time train for controlling said motor, and means independent of said time train for governing the flow of air to and from the system.

3. In a pneumatic clock system, air displacing mechanism, a motor for operating said air displacing mechanism, a time train for controlling said motor, and means actuated by the motor for opening the system to the atmosphere near the end of the inflating movement of the air displacing mechanism.

4. In a pneumatic clock system, air supplying and exhausting mechanism, a motor for operating said air mechanism, a time train for controlling said motor, and means for opening the system to the atmosphere at the end of the exhausting action of said mechanism, said means being also adapted to shut off the system from the atmosphere at the beginning of each supplying action of said air mechanism.

5. In a pneumatic clock system, air supplying and exhausting mechanism, a motor for operating said supplying and exhausting mechanism, a time train for controlling said motor, means for opening the system to the atmosphere at the end of the exhausting action of said mechanism, said means being also adapted to shut off the system from the atmosphere at the beginning of each supplying action of said mechanism, and means for permitting a flow of air to the system during the period of the exhausting operation of said mechanism in the event of leakage in the system.

6. In a pneumatic clock system, air displacing mechanism, a motor for operating said air displacing mechanism, a time train for controlling said motor, means for opening the system to the atmosphere in the period said air displacing mechanism is not in action, said means being also adapted to shut off the system from the atmosphere at the beginning of each operation of said air displacing mechanism, and means for permitting a flow of air to and from the system during the period of operation of said air displacing mechanism in the event of leakage in the system, said means being also adapted to indicate the pressure in the system.

7. In a pneumatic clock system, an air displacing element, a motor, and variable leverage mechanism by which said motor directly actuates said air displacing element with increasing mechanical advantage to meet the increasing resistance to said air displacing element.

8. In a pneumatic clock system, a plurality of air displacing elements, a motor, and variable lever mechanism by which said motor directly actuates said air displacing elements alternately, each with increasing mechanical advantage to meet the increasing resistance to its respective displacing element.

9. In a pneumatic clock system, a plurality of air displacing elements, a motor, and variable lever mechanism by which said motor directly actuates said air displacing elements alternately, each with increasing mechanical advantage to meet the increasing resistance to its respective displacing element, the movement of one of said elements causing another to be brought into operative position with respect to said motor.

10. In a pneumatic clock system, a plurality of air displacing elements, a motor, means by which said motor actuates said air displacing elements alternately, each with increasing mechanical advantage to meet the increasing resistance to its respective displacing element, the movement of one of said elements causing another to be brought into operative position with respect to said motor, and means for adjusting the movements of said elements independently without disturbing their common equilibrium.

11. In a pneumatic clock system, an air displacing element, and a motor comprising parts having motions in opposite directions and adapted to impart displacing and return movements to said air displacing element.

12. In a pneumatic clock system, an air displacing element, a motor for actuating said element at predetermined intervals, a time train for controlling said motor, and means for retaining said element in its operated position during said intervals, said means being actuated by the motor to release said element.

13. In a pneumatic clock system, an air displacing element, a motor for actuating said element at predetermined intervals, a time train for controlling said motor, means for retaining said element in its operated position during said intervals, and means actuated by said motor for releasing said retaining means at the beginning of each operation.

14. In a pneumatic clock system, air displacing mechanism, means for opening said system to the outside air, and automatic means for changing the moment of action of said opening means.

15. In a pneumatic clock system, the combination with a plurality of air displacing elements, of a motor for actuating said elements, means for supporting said elements permanently with relation to each other and with relation to said motor, and means adjustably connecting said motor with said elements to independently vary the displacing movement of each of said elements.

16. In a pneumatic clock system, a plurality of air displacing elements each permanently mounted and balanced with respect to gravity, and means for adjusting the displacing movement of each element.

17. In a pneumatic clock system, a plurality of air displacing elements comprising pivoted members and bellows, each of said bellows being operatively permanently attached to one of said pivoted members, and means for adjusting the displacing movement of each bellows.

In testimony whereof, I have subscribed my name.

AUGUSTUS L. HAHL.

Witnesses:
HENRY A. PARKS,
ANNA L. WALTON.

Copies of this patent may be obtained for five cents each, by addressing the "Commissioner of Patents, Washington, D. C."